United States Patent
Jacovi et al.

(10) Patent No.: US 7,805,702 B2
(45) Date of Patent: Sep. 28, 2010

(54) COLLABORATIVE DEVELOPMENT ENVIRONMENTS FOR SOFTWARE

(75) Inventors: Michal Jacovi, Rakefet (IL); Yoelle Maarek, Haifa (IL); Amnon Ribak, Misgav (IL); Vladimir Soroka, Carmiel (IL)

(73) Assignee: International Business Machines Corporation, Armonk, NY (US)

( * ) Notice: Subject to any disclaimer, the term of this patent is extended or adjusted under 35 U.S.C. 154(b) by 1512 days.

(21) Appl. No.: 10/695,972

(22) Filed: Oct. 29, 2003

(65) Prior Publication Data

US 2005/0097508 A1 May 5, 2005

(51) Int. Cl.
*G06F 9/44* (2006.01)
(52) U.S. Cl. .................. 717/103; 717/102; 717/101; 717/124
(58) Field of Classification Search .................. 717/124, 717/101–103
See application file for complete search history.

(56) References Cited

U.S. PATENT DOCUMENTS

| | | | | |
|---|---|---|---|---|
| 5,715,415 | A * | 2/1998 | Dazey et al. ................. | 715/708 |
| 5,740,444 | A * | 4/1998 | Frid-Nielsen ............... | 717/102 |
| 6,199,193 | B1 | 3/2001 | Oyagi et al. | |
| 6,513,154 | B1 | 1/2003 | Porterfield | |
| 7,039,677 | B2 * | 5/2006 | Fitzpatrick et al. .......... | 709/204 |
| 7,152,220 | B2 * | 12/2006 | Rickards et al. ............. | 717/101 |
| 2003/0018719 | A1* | 1/2003 | Ruths et al. ................. | 709/205 |
| 2003/0070176 | A1* | 4/2003 | Parker et al. ................. | 725/105 |
| 2004/0003371 | A1 | 1/2004 | Coulthard et al. | |
| 2004/0158811 | A1* | 8/2004 | Guthrie et al. ............... | 717/103 |

* cited by examiner

*Primary Examiner*—Lewis A Bullock, Jr.
*Assistant Examiner*—Michael Yaary

(57) ABSTRACT

A collaborative development environment includes an integrated development environment and a collaboration client integrated into the environment. There also is a Help menu of a software application which includes sections to provide information about the software application and a peer support section to provide access to a collaboration server.

7 Claims, 5 Drawing Sheets

COLLABORATIVE DEVELOPMENT ENVIRONMENTS FOR SOFTWARE

FIELD OF THE INVENTION

The present invention relates to collaboration systems generally and to such systems within software development environments in particular.

BACKGROUND OF THE INVENTION

There are many tools to help a software programmer produce code. One standard tool is the integrated development environment (IDE), which provides the programmer with a programming environment. Typically, the IDE includes an editor, for writing the code, tools for tracing the operation of the code, tools for selecting pre-defined and previously defined programming objects used in the code, tools for selecting files, etc. Like most software packages, the IDE includes a help section which provides the programmer with help on how to utilize the IDE.

Some IDEs provide quick access to advanced help systems, which include API references, technical backgrounds, 'How-to' articles and code samples. Assuming that users are mostly online, IDE vendors also provide links to more material on their Web sites (e.g. the Sun Developer Connection, Borland, MSDN Online, etc.). However, all those materials are of a static and general type, and users thus often go to newsgroups and forums, in which they can explicitly describe their specific problems, and get support from peer developers from all over the world. Examples include the IBM Partner-World for Developers, the Servlet Developers Forum, the Java Developer Connection, Dave Central, and many more.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
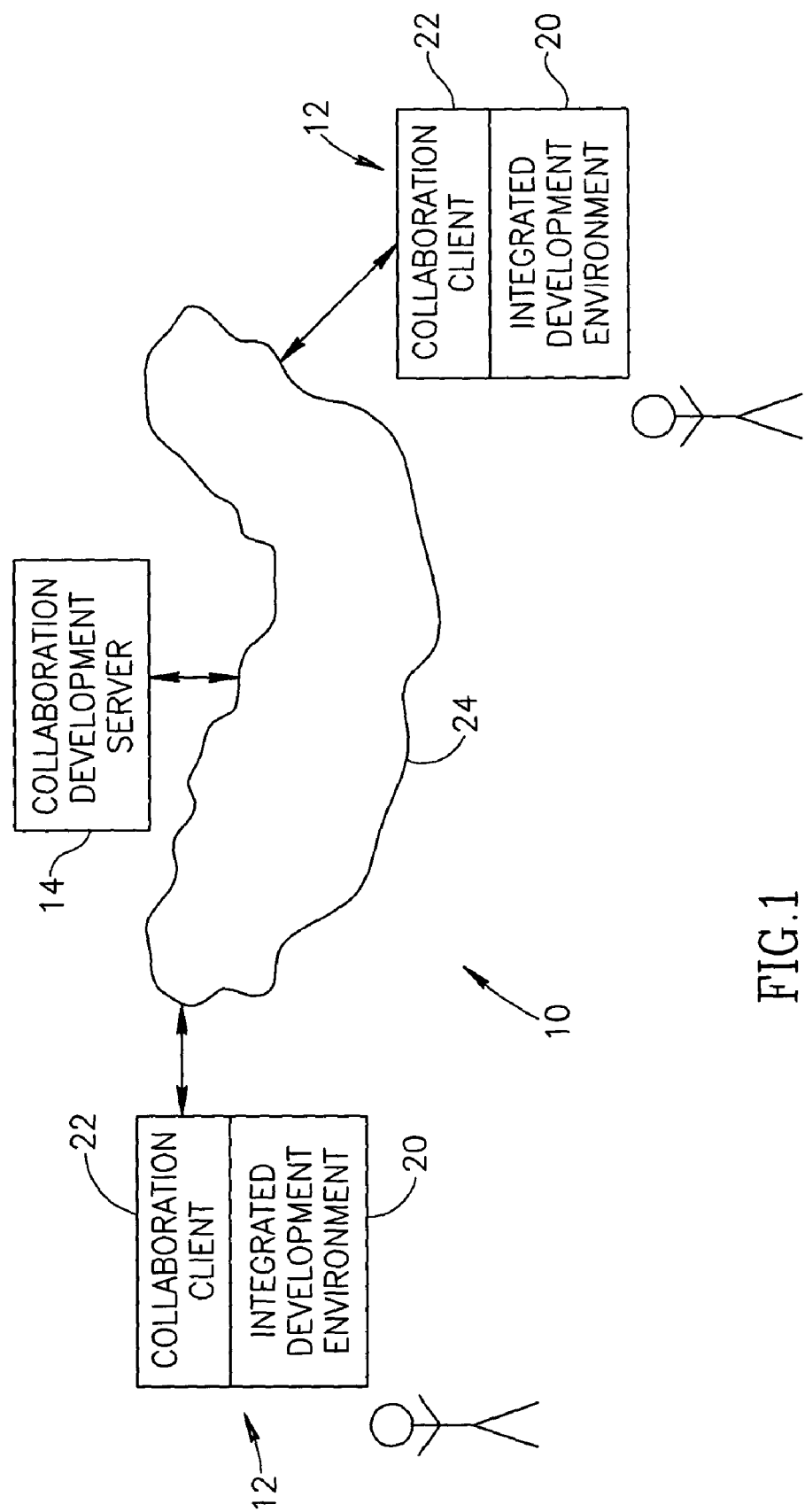
FIG. 1 is a schematic illustration of a collaborative development environment, constructed and operative in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Reference is now made to FIG. 1, which illustrates a collaborative development environment (CDE) 10, constructed and operative in accordance with the present invention. CDE 10 may comprise a plurality of collaborative development clients 12 and a collaborative development server 14.

CDE 10 may provide developers 16 with the ability to collaborate about the software they may be producing while they are programming, rather than at a coffee machine, in a group setting or through a forum, as in the past. In the present application, "collaborate" refers to any electronic communication with another person. Such a communication might be by email, instant messaging or any other appropriate form. In general, such a communication may be relatively quick, such that the developer 16 asking the question may receive an answer to the question while working.

Each collaborative development client 12 may comprise an IDE 20 and a collaboration client 22, where each collaboration client 22 may communicate with collaborative development server 14 via a network 24. Collaborative development server 14 may be any suitable collaboration server which may provide the ability to post questions to appropriate potential advisors and to provide the resultant discussion to anyone who chooses to view the discussion. Server 14 may be based on an instant messaging system or a Chat system to which "persistency" is added to generate the resultant discussion.

Collaboration client 22 may be integrated within IDE 20 such that a programmer may ask a question or view a discussion while generating or debugging a program. In one embodiment, shown in FIG. 2, collaboration client 22 may be accessed through the Help Menu, such as is found in most software. In another embodiment, shown in FIG. 3, collaboration client 22 may be accessed or viewed through an Edit workspace.

Figure 2:
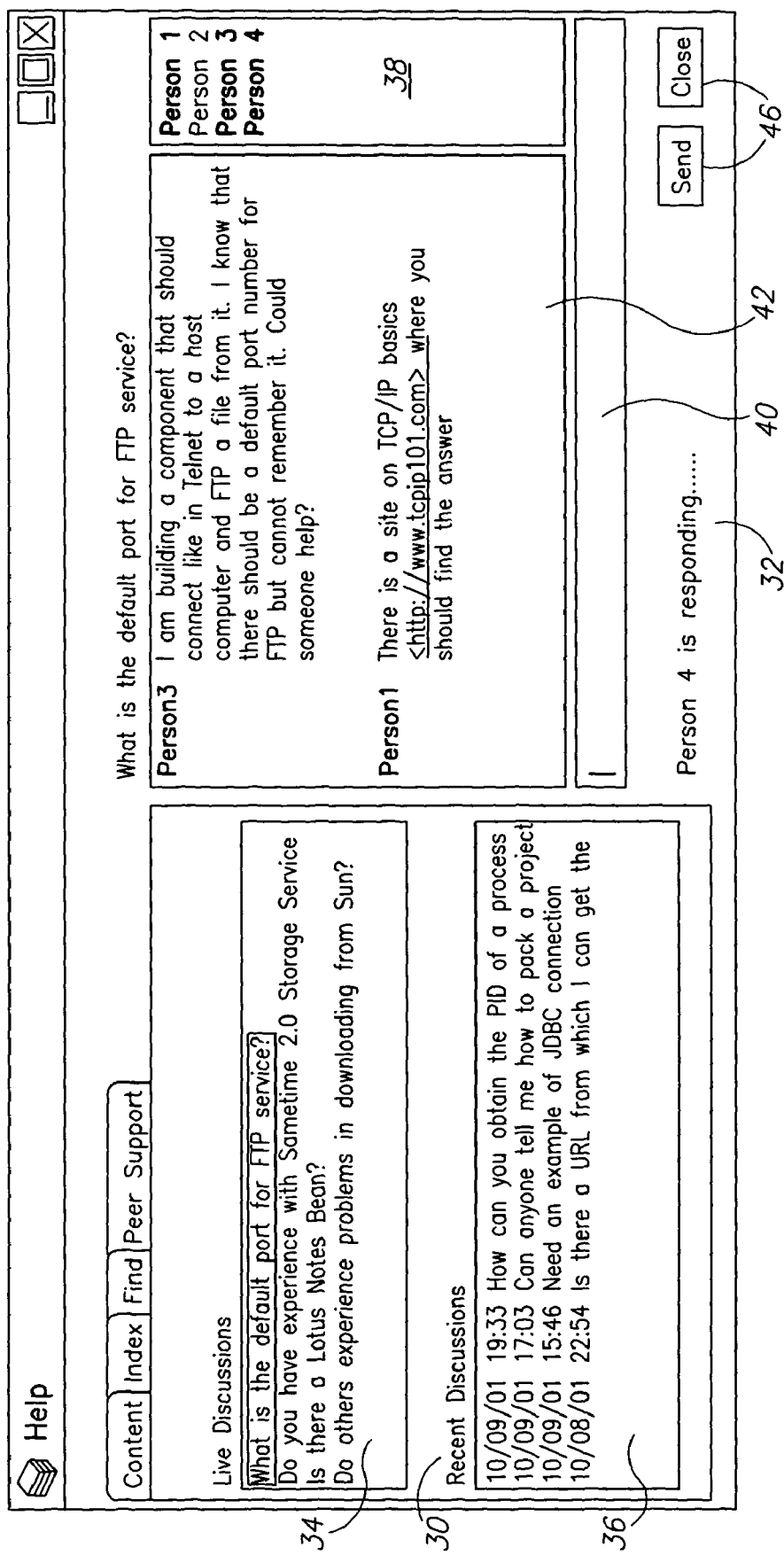
FIG. 2 is a schematic illustration of a screen of a Help menu of a collaboration client in the environment of FIG. 1.

FIG. 2, to which reference is now made, shows a screen in the Help Menu of development client 12. As can be seen, the Help Menu may have four sections, Content, Index, Find and Peer Support. The first three sections may be standard Help Menu sections. The fourth section, Peer Support, may provide access to collaboration client 22. It will be appreciated that the help provided within collaboration client 22 may be about any issue that the programmer may have and is not restricted to how to use the IDE 20 as are the other, standard Help sections. Moreover, collaboration client 22 may provide "peer support" (i.e. help from other programmers).

Peer Support may have two windows, a listing window 30 and a discussion window 32. Listing window 30 may list the discussion topics and discussion window 32 may present a selected discussion, where each discussion topic may be titled by the question that initiated it. For example, the selected discussion (marked with a dark background) may be entitled: "What is the default port for FTP service?"

Listing window 30 may be divided into two sections, a live discussion section 34 and a recent discussion section 36. Live discussion section 34 may list discussions that currently are "live" while recent discussion section 36 may list discussions that are not live at the moment, where "live" may mean a discussion that may be available for editing. After a pre-defined period of time, discussions may become read-only. Recent discussions may be those that are now read-only but the user participated in them. Recent discussion section 36 may also list when the discussion last had new input into it.

The discussion topics which may be listed may be selected according to any suitable criteria. In one embodiment of the present invention, the topics may be all of the discussions currently registered to the programming group or groups that the current programmer may belong to. In another embodiment, the topics may be those related to the work which the current programmer may be doing. In another embodiment, the current programmer may register his fields of interest and the topics are thus, only in his fields of interest. A further embodiment may incorporate all or some of the previous embodiments.

Discussion window 32 may have the elements useful for a discussion. It may take the well-known form of a chat room or an instant messaging system or any other suitable discussion format.

In the example of FIG. 2, there may be a window 38 listing the programmers (Person 1, Person 2, etc.) involved in the discussion, where a bolded name may indicate that the programmer currently has the discussion window open and a non-bolded name may indicate someone who does not have the discussion window open but who has contributed to the discussion. A programmer may enter the chat room when he selects a discussion.

There may also be a window 40 where the current programmer (Person 4) may enter his contributions to the discussion and a window 42 where the collected contributions of all of the involved programmers may be listed. In the latter, each contribution may be marked with the person who contributed it. There may also be buttons 46 which may enable the current programmer to send his contribution to the discussion once he has finished entering it or to close collaboration client 22.

Figure 3:
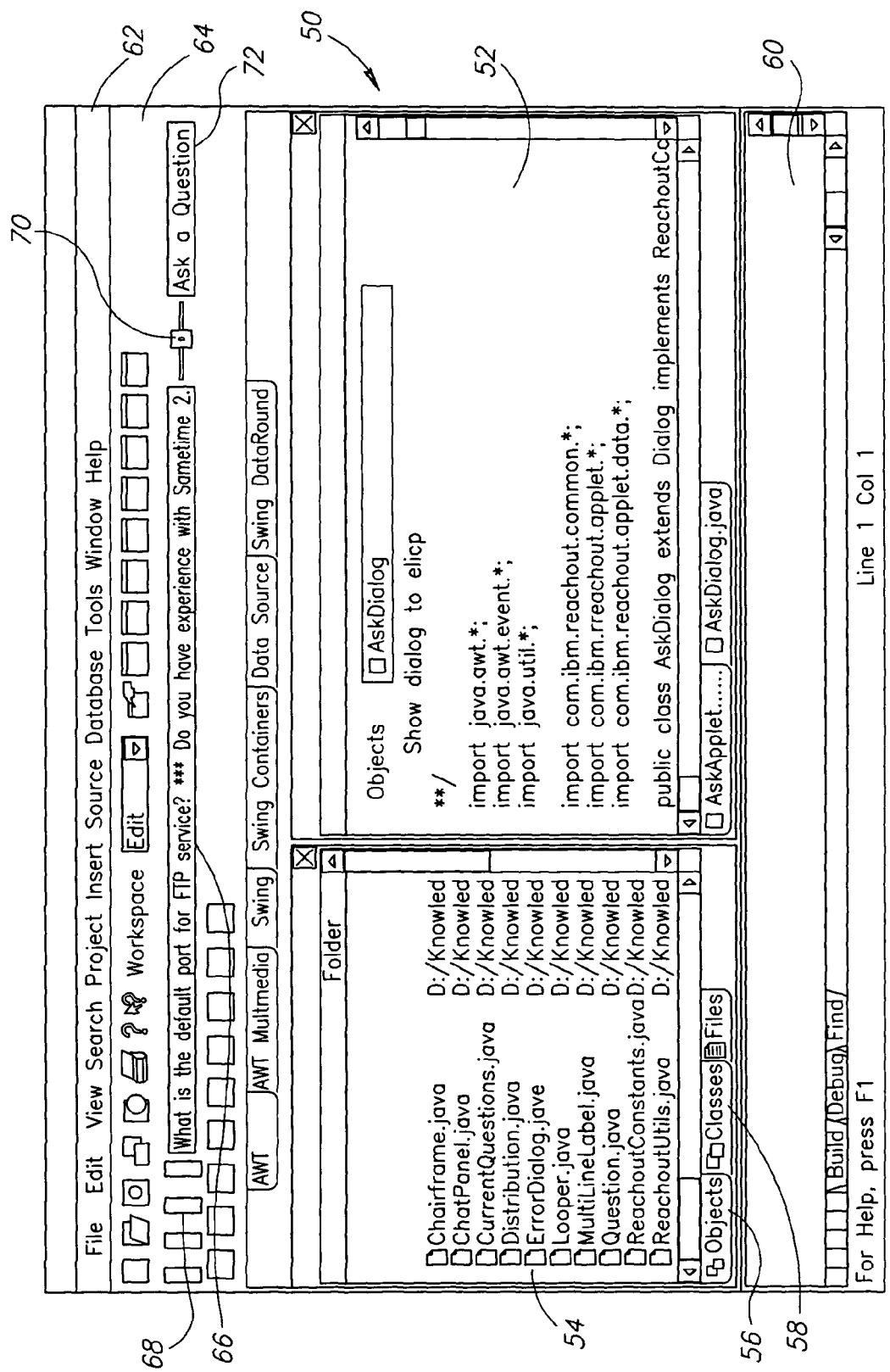
FIG. 3 is a schematic illustration of a screen of an editing menu of the collaboration client of FIG. 2.

Reference is now made to FIG. 3, which illustrates an alternative embodiment of the present invention in which collaboration client 22 may be accessible from an Edit workspace 50 of IDE 20. The exemplary IDE in this embodiment is the VisualCafe by Symantec Corporation of the USA.

Edit workspace 50 may comprise a plurality of windows, each showing the current programmer different aspects of the program he may be writing. For example, there might be one window 52 showing the code he is currently editing. There might be another window 54 showing the files forming part of the program he is creating. There might be other windows (shown by their tabs), showing the objects 56 or classes 58 that the current programmer currently has available to him. There might be a window 60 that may show the results of a build, debugging or find operation.

In the example of FIG. 3, there are a plurality of toolbars 62 which provide the current programmer with pushbutton operations. In accordance with a preferred embodiment of the present invention, collaboration client 22 may provide another toolbar 64 in the display. This toolbar may comprise items useful for collaboration client 22. For example, there might be a "ticker" 66 listing some new or updated discussions relevant to the current programmer, where "relevant" may be defined in any suitable manner. For example, "relevant" might be defined by the groups that the current programmer is associated with, or it might be a function of the work that the current programmer is currently doing. Alternatively or in addition, the discussion may be directed to the current programmer, as being the person or one of the persons most likely to be able to answer the question. Ticker 66 may be relatively non-intrusive but it may be placed in a prominent position so as to improve the chances for a question to be seen and answered "live" by the current programmer.

Toolbar 64 may also comprise awareness gauges 68 which may indicate the number of people currently actively involved in the discussions relevant to the current programmer and the number of currently active discussions. Clicking on a gauge opens the relevant list. For example, the gauge of the number of people involved may provide the list of people when clicked and the gauge of the number of discussions may provide a list of the discussion topics when clicked. An exemplary gauge is described in the application having attorney number (IL9-1999-0038 Divisional.)

Toolbar 64 may include a slider 70 which the current programmer may move to indicate to other programmers his willingness to answer questions posted directly to him. If the current programmer places the slide on 'not willing', then the other programmers will not see him on their list of available advisors.

Another item on toolbar 64 may be a question button 72 with which the current programmer may initiate a discussion. Pushing on question button 72 may bring up a dialog, shown in FIGS. 4A, 4B and 4C to which reference is now briefly made, in which the current programmer may type his question and may indicate to which programmers or groups of programmers to post the question.

Figure 4A:
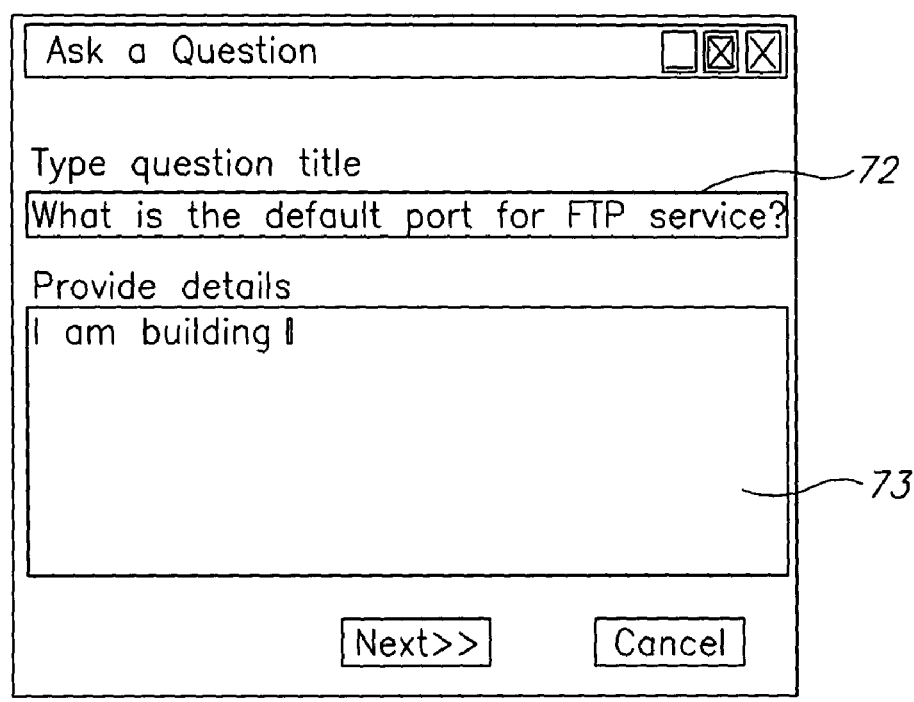
FIGS. 4A, 4B and 4C are schematic illustrations of screens of an "Ask A Question" dialog of the collaboration client of FIG. 2.
Figure 4B:
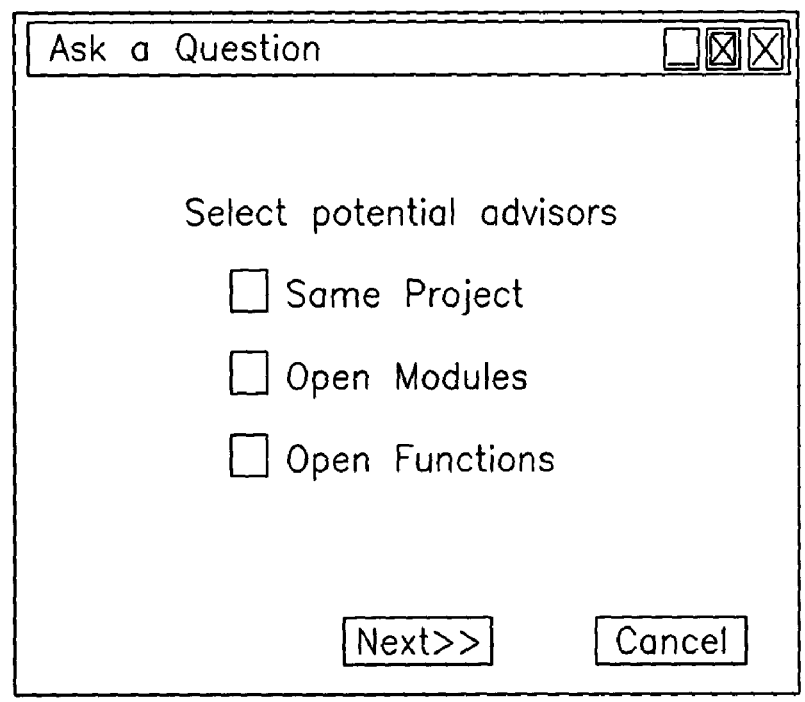

FIG. 4A shows an exemplary screen which may arise when question button 72 may be pushed. The screen may include a section 72 in which the current programmer may type in his question (which may become the discussion topic) and a section 73 in which he may elaborate. FIG. 4B shows an exemplary next screen in which the current programmer may select potential advisors from among a set of types of advisors. FIG. 4B shows these sets to be people from the same project as the current programmer, those who are working on the same open modules or on the same open functions. Other groupings of people may also be possible and are incorporated into the present invention. The question may then be sent to the advisor(s) of the selected group. Alternatively, the current programmer may select an advisor or advisors from a list generated from his choice of selected group.

Figure 4C:
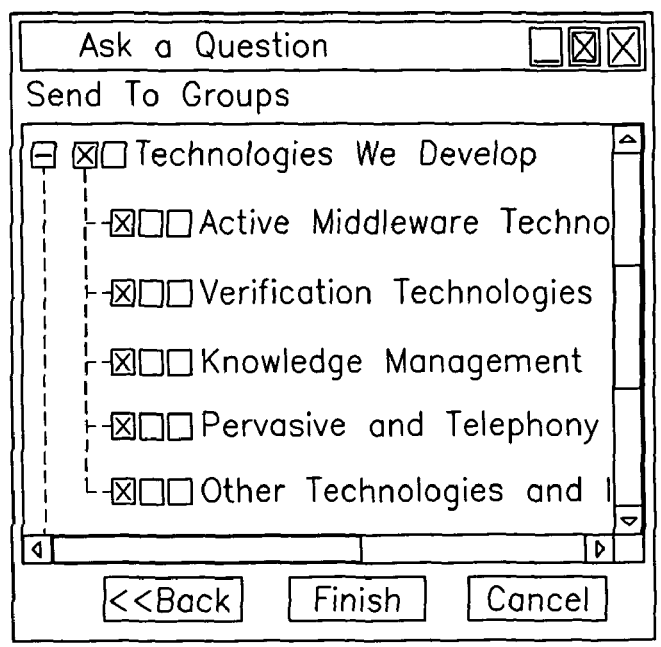

FIG. 4C shows a further screen in which the current programmer may choose further groups of people, not necessarily related to his current work, to which to send his question. These groups may be of people in the company and may be organized in any desired manner.

The people who are listed may be those who have agreed to answer questions and they may receive the questions when they have the discussion window open and/or at a later time.

Figure 5:
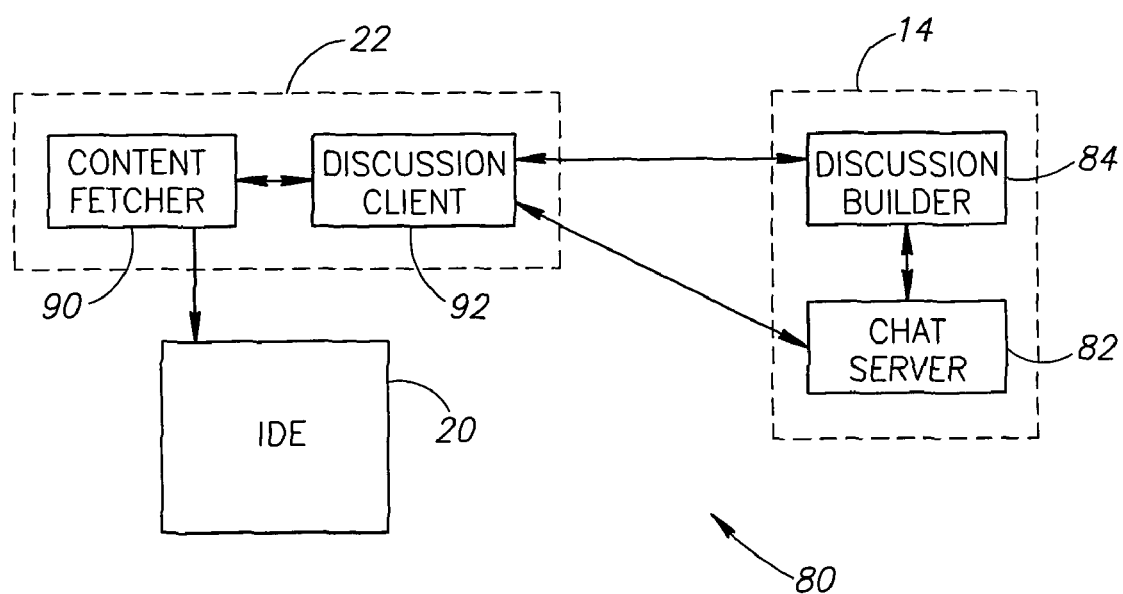
FIG. 5 is a block diagram illustration of elements of the environment of FIG. 1.

Reference is now made to FIG. 5, which illustrates an exemplary collaborative development environment (CDE) 80 based on a chat server 82, constructed and operative in accordance with the present invention.

In this embodiment, collaborative development server 14 may be implemented with chat server 82 overlaid with a discussion builder 84. Chat server 82 may be any suitable chat or instant messaging server, such as Lotus Sametime Connect, commercially available from International Business Machines (IBM) of the USA. Discussion builder 84 may be any suitable device which may take the unstored conversations of chat server 82, may make them "persistent" (i.e. may keep the conversations alive even if no one contributes to them after a period of time) and may combine them into a multi-person discussion forum. Each forum has a discussion topic and a contributor may access the forum by selecting its topic, rather than by selecting a person to talk to as is the case for chat server 82. Builder 84 may provide an entering contributor with the entire discussion up until the present moment and may enable the contributor to contribute to the forum.

Builder 84 may provide an extension of chat server 82 for asking questions in virtual, ad-hoc communities. Builder 84 may provide the ability to post questions synchronously to selected potential advisors via a ticker (such as ticker 66) and may have a basic load balancing mechanism to reduce the probability that advisors become swamped with questions. The ticker may form part of IDE 20, may be a plug-in, an applet or a portlet (if the IDE is web-based).

An exemplary discussion builder 84 is ReachOut, described in the following articles:

1) Ribak, A., Jacovi, M., and Soroka, V. (2002). "Ask Before You Search": Peer Support And Community Building With Reachout", in *Proceedings ACM Computer Supported Cooperative Work (CSCW* 2002), New Orleans, La., pp. 126-135;
2) Soroka, V., Jacovi, M., Ur, S. "We Can See You: A Study of the Community's Invisible People through Reachout", in Huysman, M., Wenger, E., and V. Wulf (eds.), *Proceedings of International Conference on Communities,* 2003; and
3) *Technologies (C&T*2003), Kluwer Academic Publishers, Amsterdam, 2003, pp.65-79.

Collaboration client 22 may comprise a context fetcher 90 and a discussion client 92. Discussion client 92 may provide the current programmer with access to discussion builder 84 and to chat server 82. Thus, discussion client 92 may provide the chat room elements of window 32 (FIG. 2) and may provide the communications of the current programmer to discussion builder 84 and chat server 82. Similarly, discussion client 92 may fetch the selected discussion from discussion builder 84 and may display it to the current programmer.

Discussion client 92 may operate together with context fetcher 90 which may, in turn, determine the context in which the current programmer is operating. Context fetcher 90 may then provide the context definition to discussion client 92 who may, in turn, fetch only those discussion topics of discussion builder 84 which are appropriate to the context definition.

The context may be defined in many ways. As described hereinabove, the context may simply be defined by the groups to which the programmer has registered. In another embodiment, the context may be defined by the work which the current programmer may be doing. For example, context fetcher 90 may log the activities of the current programmer, such as opening and closing files, how frequently s/he works on each and how recently. Discussion builder 84 may review this data and may group the currently active programmers by their similar activities. Thus, if two programmers are working on the same file, or the same directory or directories of files, or the same project, then discussion builder 84 may group these programmers together. Discussion builder 84 may then provide discussions and questions to the current programmer from those programmers which are part of his current group. When the current programmer changes the code that s/he may be working on, s/he may change groups and thus, discussion builder 84 may send him a different set of discussions.

In another embodiment, context fetcher 90 may review the window, menu, etc. of IDE 20 that the current programmer may currently be working in, may review the kind of work being performed (editing, building, compiling, etc.), the file, project, class, object, etc. that the current programmer may be utilizing, etc. Context fetcher 90 may ask the current programmer which of a list of projects s/he is working on, interested in, etc. Based on any of these, context fetcher 90 may select a group and may send the group selection to discussion builder 84 who, in turn, may send back the discussion topics of the selected group.

Alternatively or in addition, discussion builder 84 may select the appropriate advisor based on the information provided by context fetcher 90. For this, context fetcher 90 may trace usage history, may find who worked on related projects, may locate users of particular components of the software, etc.

In one embodiment of the present invention, context fetcher 90 may attempt to determine the context in which a possible problem arose. Context fetcher 90 may do so by continually or periodically monitoring some or all of the keyboard activity of the programmers using the system, the files which the current programmer has open and the function or module where the current programmer may be working. Context fetcher 90 may send messages to discussion builder 84 as to the current context of the current programmer. Discussion builder 84 may maintain a database of the current context of the programmers associated therewith.

From this information, context fetcher 90 may determine an active project, a collection of open source files, the source code file currently in focus and, possibly, the current function that the current programmer has open (e.g. one that has a cursor in it). Context fetcher 90 may then use the following heuristics to propose a set of advisors to the current programmer:

a) everyone who ever worked on the current project;
   b) everyone who ever edited the open source files or the source file currently in focus; and/or
   c) everyone who ever edited the current function.

Context fetcher 90 may determine these sets of people while the programmers work on the files. Additionally, predetermined comments, such as those describing authors of modules and functions, may be used. For example a standard, called Javadoc, contains a directive @author to provide the name of the author of a function or module. Finally, programmers may register to receive questions about certain projects, modules and/or functions.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method comprising:
    determining a context of work for a user in an integrated development environment (IDE) based on the work of the user;
    automatically selecting from among a list of peers those related to said context of work;
    accessing peer support resources, wherein said peer support resources are available from a universe of users with a commonality of interest with said user, external to said IDE from within said IDE upon instructions from said user of said IDE;
    providing said user with means to ask questions of selected peers; and
    enabling said user to communicate with said peer support resources.

2. A method according to claim 1 and wherein said accessing peer support comprises displaying at least one list of existing topics of discussion and providing said user with a selector to select one of said topics.

3. A method according to claim 2 and wherein said providing also comprises opening a window for said user to participate in a selected discussion.

4. A method according to claim 3 and wherein said opening comprises retrieving said selected topic from a collaborative development server.

5. A method according to claim 2 and wherein said providing said user comprises selecting from said existing topics those related to said context of work.

6. A method according to claim 2 comprising:
displaying topics of discussions based on work being performed in an integrated development environment.

7. A method according to claim 6 and wherein said work is defined by at least one of the following: the current file, the current class, the current object, the current project, and the current function.

* * * * *